United States Patent [19]
Lange

[11] Patent Number: 5,639,958
[45] Date of Patent: Jun. 17, 1997

[54] DEVICE AND A METHOD FOR LOCALIZING LEAKAGES IN CONDUIT NETWORKS

[75] Inventor: Gösta Lange, Göteborg, Sweden

[73] Assignee: Ingenjorsfirma Ultrac AB, Sweden

[21] Appl. No.: 530,207

[22] PCT Filed: Mar. 29, 1994

[86] PCT No.: PCT/SE94/00283

§ 371 Date: Jan. 25, 1996

§ 102(e) Date: Jan. 25, 1996

[87] PCT Pub. No.: WO94/23242

PCT Pub. Date: Oct. 13, 1994

[30] Foreign Application Priority Data

Mar. 29, 1993 [SE] Sweden ................... 9301020

[51] Int. Cl.$^6$ .................. G01M 3/24; G01N 29/04; F22B 37/42
[52] U.S. Cl. .................. 73/40.5 A; 73/40; 73/592
[58] Field of Search .................. 73/40.5 A, 592, 73/40

[56] References Cited

U.S. PATENT DOCUMENTS

| | | | |
|---|---|---|---|
| 2,008,934 | 7/1935 | Smith | 137/77 |
| 3,596,510 | 8/1971 | Siegel et al. | 73/149 |
| 4,043,180 | 8/1977 | Morris et al. | 73/40.5 A |
| 4,309,576 | 1/1982 | Corrigan | 179/110 A |
| 4,435,974 | 3/1984 | Fuchs et al. | 73/40.5 A |
| 4,498,333 | 2/1985 | Parthasarathy | 73/40.5 A |
| 4,543,817 | 10/1985 | Sugiyama | 73/40.5 A |
| 4,583,406 | 4/1986 | Dimeff | 73/592 |
| 4,779,246 | 10/1988 | Dietzsch et al. | 367/157 |
| 4,785,659 | 11/1988 | Rose et al. | 73/40.5 A |
| 4,810,913 | 3/1989 | Beauducel et al. | 310/337 |
| 4,960,079 | 10/1990 | Marziale et al. | 122/504.2 |
| 5,101,774 | 4/1992 | Marziale et al. | 122/504.2 |
| 5,117,676 | 6/1992 | Chang | 73/40.5 A |
| 5,361,636 | 11/1994 | Farstad et al. | 73/592 |

OTHER PUBLICATIONS

Derwent's abstract, No. 89–148814/20, week 8920, Abstract of SU, 1413354 (Introscopy Res Inst), Jul. 30, 1988.

Primary Examiner—Hezron E. Williams
Assistant Examiner—J. David Wiggins
Attorney, Agent, or Firm—Finnegan, Henderson, Farabow, Garrett & Dunner, L.L.P.

[57] ABSTRACT

Device and method for locating leaks in pipelines, overhearing even weak sounds, from leaking fluid especially in pipelines made of material with limited sound conductivity such as plastic. The device includes a first thin diaphragm with one side in contact with the fluid, whereby vibrations are transferred from the fluid to a second diaphragm joined to the opposite side of the first diaphragm. The second diaphragm is made of a preferably sound-sensitive piezo-electrical plastic foil, the diaphragms being able to co-vibrate with frequencies from one to a few thousand Hertz. The first diaphragm protects against the inner pressure in the liquid line and moderates any sympathetic vibration. The low-frequency A.C. that is generated by the vibration in the second diaphragm is amplified and transposed to a range of frequencies that is audible for the human ear.

9 Claims, 3 Drawing Sheets

DEVICE AND A METHOD FOR LOCALIZING LEAKAGES IN CONDUIT NETWORKS

TECHNICAL FIELD

The present invention relates to a device and to a method for localizing leakages in conduit networks, by listening for sound, even slight sound, generated by leaking liquid, particularly in pipe systems that are comprised of materials which have only low sound conductivity, such as plastic materials and the like.

DESCRIPTION OF THE BACKGROUND ART

Roughly 25% of the amount of liquid distributed in extensive conduit networks, for instance networks which convey water or oil under pressure, is lost because of leakage in the system. This is a serious problem with regard to economy and also with regard to the environment.

One method of minimizing these drawbacks is to have at one's disposal an effective and simple auxiliary device by means of which the distribution system can be checked with the intention of discovering a possible leakage as early as possible.

Personnel engaged in finding leaks are accustomed to relying on their own hearing to ascertain the presence of a leak, by listening directly. It is difficult, however, for the human ear to discern sound that has been propagated in a leaking plastic pipe.

It is also difficult to discern the sound of a leak against background noise, for instance against pronounced traffic noise.

Many different technical solutions relating to listening devices for localizing leakages in different types of pipe systems are known within this technical field. The sounds generated by a substance leaking from a pipe or conduit can be listened for directly, or is signal processed in different ways. Various listening methods have been developed, such as the arrangement of electronic amplifiers which have enabled even relatively weak sound to be discerned. These amplifiers must be used together with acoustic sensors which convert the pressure waves into electric signals. In this regard, there have been used microphones which are pressed directly against pipes or fittings in the same way as the ear of the listener is pressed when listening directly. However, it has been found that the best method of discovering leakages, even small leakages, is to listen directly against the liquid or substance concerned. This is best effected with the aid of a hydrophone, which is coupled to the liquid either through a separate hole drilled in the conduits, or by passing the hydrophone to existing fire cocks, fire hydrants or the like, which are opened so that the water is able to rise to the level of the sensing surface of the hydrophone.

These devices cannot normally be used, however, in conduit networks in which the conduits or pipes are made of a plastic material, for instance, since essentially only low acoustic frequencies of the leakage sound are able to propagate over longer distances in the pipes. These sounds cannot be heard by the human ear, not even with the aid of an amplifier and earphones. It is therefore necessary to use electronic measuring apparatus in cases such as these. This means that the person who is specially trained to find leakages and who is accustomed to listen for sound in cast-iron pipes is unable to apply his expertise in deciding whether or not there is a leakage in the modern plastic pipes. This is a very serious drawback, since the human hearing is paramount with regard to distinguishing between different sounds that occur in pipes, i.e. between leakage sounds or traffic sounds.

The acoustic converters used in hydrophones are normally comprised of piezoelectric crystals having a high resonance frequency, e.g. a frequency of 100 kHz. This crystal can be combined with a mechanical element, such as a diaphragm, having a lower resonance frequency.

Examples of such known devices are found in U.S. Pat. Nos. 2,008,934, 4,435,974, 4,236,235, 4,779,246 and 4,810,913.

The device taught by U.S. Pat. No. 4,779,246 includes a diaphragm which has been tensioned in a way to provide the lowest resonance frequency.

BRIEF DISCLOSURE OF THE INVENTIVE CONCEPT

The object of the present invention is to eliminate the aforesaid disadvantages and drawbacks of devices for listening for leakage sounds in extensive pipe or conduit network systems.

Conventional devices that include an accelerometer which is pressed against a pipe wall or a valve spindle provide a relatively poor signal/disturbance ratio. There is also the risk of poor contact with the pipe wall.

When a hydrophone is used, the best listening range will depend on direct contact between the listening element and the medium.

The hydrophones that are available commercially are normally constructed for general measuring purposes and therefore have a very wide frequency range and are not optimally or directly suited for leakage finding.

These hydrophones are usually mounted in conduit networks so as to be sensitive or responsive to oscillations that are propagated in the pipe wall, meaning that traffic generated vibrations, for instance, will be fully detected.

One known method of increasing the frequency of an acoustic signal is to record the sound on a tape recorder which operates at a low speed and then play back the sound at a higher speed.

Another method is to record signals digitally with the aid of so-called sampling.

Both of these methods give "time slots" in playback, since they require the recordings to be played back at a faster speed than they were made. The sound is normally repeated and fills the slots, although at the cost of a poorer sound quality.

To achieve the objects and in accordance with the purpose of the invention, as embodied and broadly described herein, the device for localizing leakages in a conduit network of this invention comprises a first, thin diaphragm having one side oriented to lie in contact with a liquid and a second side oriented not to lie in contact with the liquid, a second sound-responsive diaphragm that is attached to and overlies the second side of the first diaphragm with a common interface therebetween, wherein the first diaphragm is designed to transmit oscillations from the liquid to the second diaphragm by the coupling of forced mechanical oscillations across the interface, the second diaphragm being made of a piezoelectric material in a sound-responsive, piezoelectric plastic sheet, wherein the first and the second diaphragms are able to oscillate together at frequencies of from zero to seven thousand Hertz, and wherein the first diaphragm is designed to withstand the internal pressure in the liquid conduit and to protect the second sound-responsive diaphragm against direct contact with the liquid, and also to attenuate any resonance oscillations of the conduit network comprising the liquid in the conduits, and an amplifier for amplifying the low-frequency electric alternating current signals generated by the oscillations in the second sound-responsive diaphragm and means for transposing the amplified signals to a frequency range which can be readily heard by the human ear. The diaphragm can be oriented in said device essentially parallel with the longitudinal direction of the conduit, so as to minimize the influence of oscillations in the conduit material on the surface of the diaphragm.

This construction renders the diaphragm insensitive to oscillations in the longitudinal direction of the conduit, i.e. directions which are parallel with the diaphragm surface, while enabling medium-carried sound that impinges transversely to the diaphragm surface to be discovered.

There is also provided in accordance with the inventive concept a device which is highly responsive to leakage sound, i.e. will allow dynamic pressure oscillations to pass through but isolates static pressure, wherein the device is reliable in operation, for instance the possible presence of an air cushion between medium and diaphragm will not cause any appreciable attenuation of the acoustic signals, and a device which has low response to ground-carried disturbances and which can be applied easily to different parts of the conduit network, and in which device the recorded sound signal is converted to a higher frequency that is audible to the human ear, by FFT-conversion, multiplication and inverse FFT-processing.

BRIEF DESCRIPTION OF THE DRAWINGS

The invention will now be described in more detail with reference to the accompanying drawings, in which.

DETAILED DESCRIPTION OF THE PREFERRED EMBODIMENT OF THE INVENTION

Figure 1:
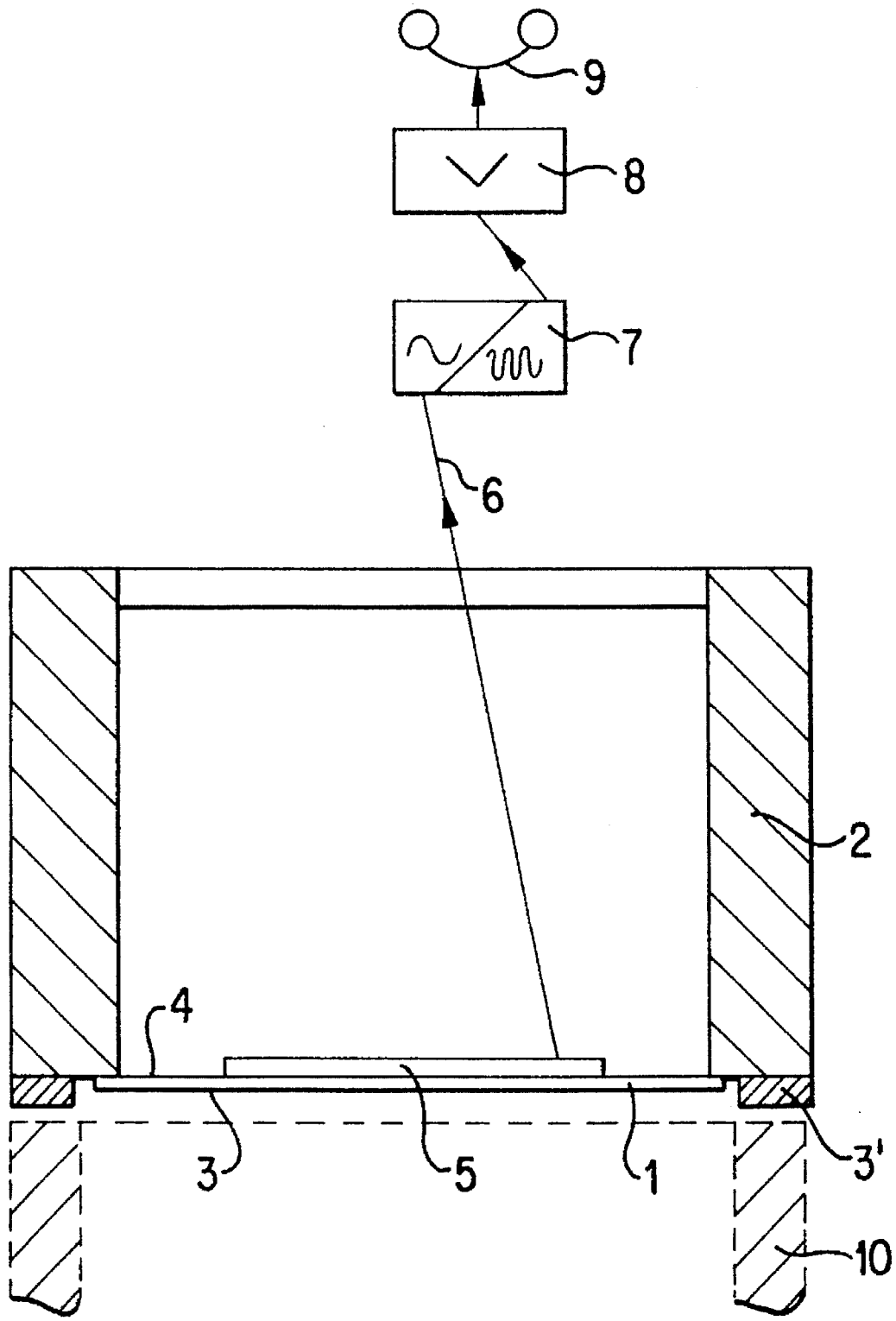
FIG. 1 is a sectioned view of the invention.

As will be apparent from FIG. 1, the inventive device includes a first circular diaphragm 1 which is made of thin stainless steel, for instance, and has a thickness of 0.05–0.06 mm. The diaphragm is attached to a rigid holder 2, for instance welded or soldered thereto. The diaphragm includes a surface 3 which is intended to lie in contact with the water conducted by the conduit system and is able to withstand the pressure of 6–10 kg/cm$^2$ prevailing in the conduits. The diaphragm also has an inner surface 4 on which a second diaphragm 5 is firmly mounted. This second diaphragm is comprised of a piezoelectric plastic sheet which is flexible and accompanies the movements of the first diaphragm, therewith generating electric signals.

These electric signals are passed through electric conductors 6 to a device 7 which analyzes the low frequency sound recorded and converts the frequency, whereafter the electric signals are sent to an amplifier 8 to which there is connected a pair of earphones 9. The holder 2 is constructed to enable it to be applied to a fire cock or fire hydrant 10, for instance, and is provided with a packing 3' for sealing the holder on the hydrant. The analyzing apparatus and the frequency converter 7 contain electronic circuits for transposing sound of low frequency to sound of higher frequency, so that the sound can be discerned by the human ear. In this regard, the acoustic signals are sampled in accordance with sampling techniques and the acoustic signals are then compressed by excluding or shortening the interval between the sampling processes. As a result, the bandwidth is also transposed in addition to the frequencies, which means that the sound will have the same character as that normally emanating from iron conduits.

Figure 2:
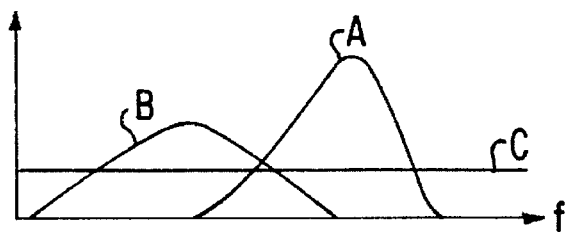
FIG. 2 illustrates frequency response curves for: B a piezoelectric crystal connected to a diaphragm with resonance; A a conventional piezoelectric crystal; and C shows the frequency response curve for the present invention.

FIG. 2 illustrates frequency response curves for: B a piezoelectric crystal coupled to a diaphragm that has resonance; A a conventional piezoelectric crystal; and C illustrates the frequency curve obtained with the present invention. It is evident from the diagram that neither the curve A nor the curve B cover low frequencies, whereas the curve C has uniform sensitivity or responsiveness from zero frequency and upwards.

Figure 3:
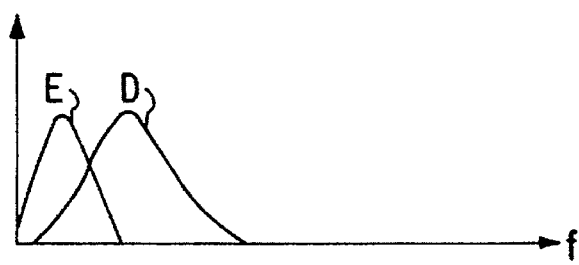
FIG. 3 illustrates frequency response curves representative of the leakage sounds occurring in conduits, E in plastic conduits and D in iron conduits.

FIG. 3 illustrates the frequency response curves representative of the leakage sounds that occur in conduits, E in plastic conduits and D in iron conduits.

A comparison between the curves shown in FIG. 3 shows that conventional diaphragm constructions can be used when listening for sound in iron conduits, although the response to sound is very poor with regard to plastic conduits, whereas a device constructed in accordance with the inventive principles can be used efficiently in both iron and plastic conduits.

Figure 4:
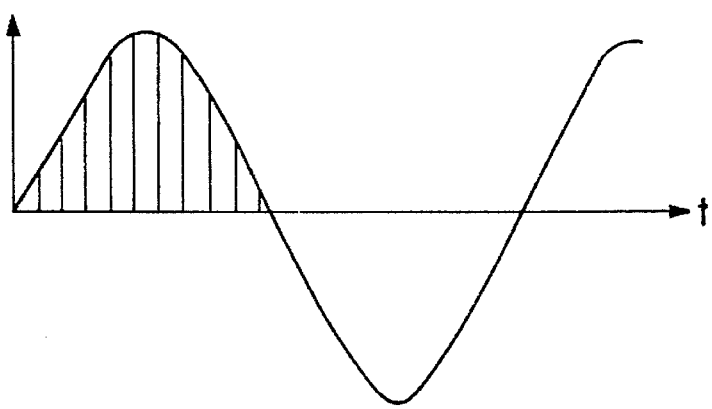
FIG. 4 is a diagram illustrating a small section taken from the curve form of the original acoustic signal.
Figure 5:
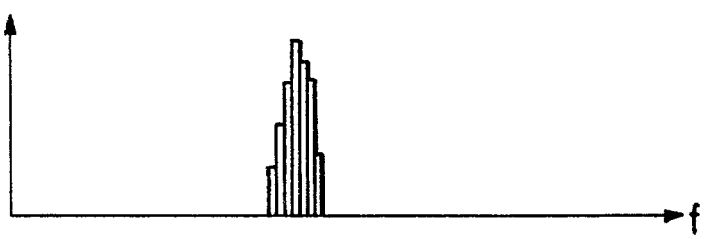
FIG. 5 illustrates sections that have been taken from the curve in FIG. 4 and recorded at elevated speeds.
Figure 6:
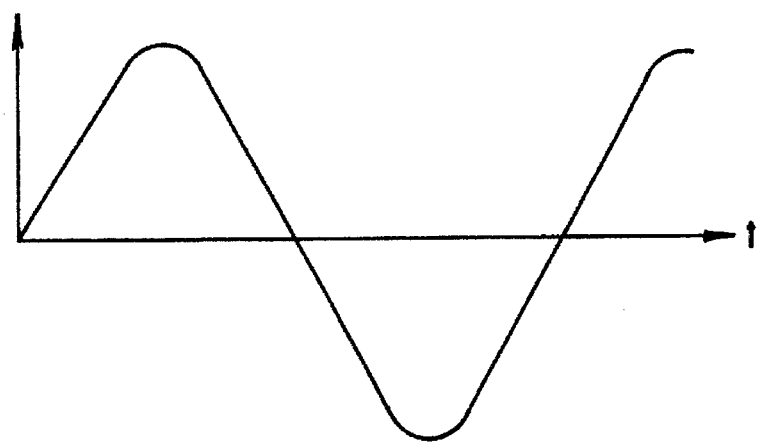
FIG. 6 is a diagram illustrating an acoustic signal.

FIGS. 4 end 5 illustrate digital recording of a signal with the aid of sampling. FIG. 4 shows small sections taken from the curve form of the original acoustic signal, and FIG. 5 shows the sections taken from said curve form and played back at higher speeds. FIG. 6 illustrates a curve representative of an incoming low-frequency acoustic signal, which for the sake of clarity has been shown as sinusoidal but which in practice can have any form.

Figure 7:
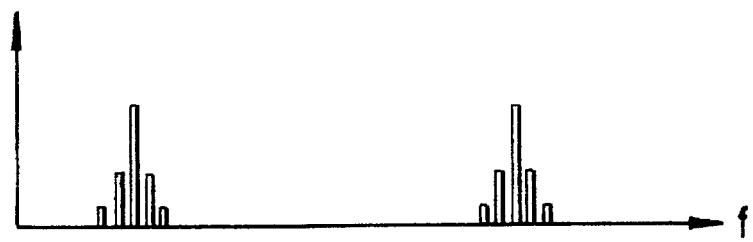
FIG. 7 illustrates the frequency spectrum of the acoustic signal shown in FIG. 6, according to FFT.

FIG. 7 illustrates a typical sound spectrum for a curve according to FIG. 6, and shows how the same spectrum can be moved to a higher frequency range by multiplication.

Figure 8:
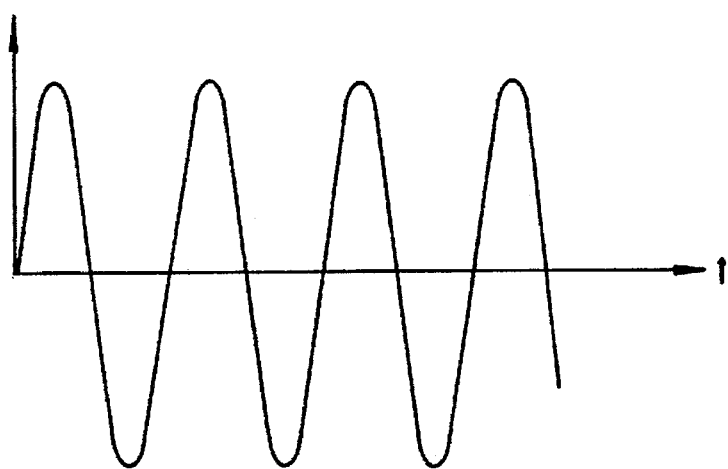
FIG. 8 illustrates the newly converted acoustic signal of higher frequency.

FIG. 8 illustrates the newly converted acoustic signal of the higher frequency, which corresponds to the spectrum in FIG. 7 moved to a higher frequency.

The device components can be assembled and joined by welding, gluing or corresponding processes.

MODIFICATIONS OF THE INVENTION

It will be understood that the invention is not restricted to the described and illustrated embodiments thereof and that modifications can be made within the following claims. For instance, the frequency can be transposed by recording the signals digitally, with the aid of sampling.

The inventive device can also be used as an acoustic transmitter when an electric voltage is applied to the piezoelectric diaphragm. This diaphragm will then function as a sound transmitter and can be used in searching for buried plastic conduits whose positions are not completely known.

I claim:

1. A device for localizing leakages in a conduit network by listening for leakage sounds emanating from a leaking liquid in conduits that are constructed from plastics and other materials having low acoustic conductivity, comprising a first, thin diaphragm having one side oriented to lie in contact with the liquid and a second side oriented not to lie in contact with the liquid, a second sound-responsive diaphragm that is attached to and overlies the second side of the first diaphragm with a common interface therebetween, wherein said first diaphragm is designed to transmit oscillations from the liquid to the second diaphragm by the coupling of forced mechanical oscillations across the interface, said second diaphragm being made of a piezoelectric material in a sound-responsive, piezoelectric plastic sheet, wherein said first and said second diaphragms are able to oscillate together at frequencies of from zero to seven thousand Hertz, and wherein said first diaphragm is designed to withstand the internal pressure in the liquid conduit and to protect the second sound-responsive diaphragm against direct contact with said liquid, and also to attenuate any resonance oscillations of the conduit network comprising said liquid in the conduits, and an amplifier for amplifying the low-frequency electric alternating current signals generated by the oscillations in the second sound-responsive diaphragm and means for transposing the amplified signals to a frequency range which can be readily heard by the human ear.

2. A device according to claim 1, wherein the first diaphragm has a thickness of 0.05–0.6 mm.

3. A device according to claim 2, wherein the first diaphragm is made of metal.

4. A device according to claim 1, wherein the first diaphragm is made of stainless steel.

5. A device according to claim 1, wherein said device is constructed so that the diaphragms are positioned generally parallel with the longitudinal direction of the conduit and therewith minimize the influence of longitudinal oscillations in the conduit material on the surface of the diaphragm.

6. A device according to claim 1, wherein electrical conductors are connected from the sound-responsive second diaphragm to said transposing means, said transposing means including a frequency converter which is connected to a pair of earphones via said amplifier connected to the output of the frequency converter.

7. A method for localizing leakages in a conduit network by means of a device according to any of claims 1–5 or 9, including transposing the sound from the low-frequency sound occurring in the conduit network to sound that can be clearly heard by the human ear by a digital sampling technique with the aid of FFT (Fast Fourier Transform) and an inverse transform.

8. A method according to claim 7, further including creating a frequency spectrum mathematically with the aid of FFT, and multiplying this spectrum frequency-by-frequency so as to obtain a spectrum of elevated frequencies, and creating a new acoustic signal of higher frequency with the aid of an inverse transform.

9. A device according to claim 1 wherein the transposing means first receives the low-frequency electric alternating current signals generated by the oscillations in the second sound-responsive diaphragm and transposes these signals to a frequency range which can be readily heard by the human ear, and wherein the amplifier amplifies these transposed signals.

* * * * *